US011314657B1

(12) United States Patent
Eddy

(10) Patent No.: US 11,314,657 B1
(45) Date of Patent: Apr. 26, 2022

(54) TABLEWALK TAKEOVER

(71) Applicant: CENTAUR TECHNOLOGY, INC., Austin, TX (US)

(72) Inventor: Colin Eddy, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 48 days.

(21) Appl. No.: 17/109,553

(22) Filed: Dec. 2, 2020

(51) Int. Cl.
  *G06F 12/10* (2016.01)
  *G06F 12/1027* (2016.01)
  *G06F 9/30* (2018.01)
  *G06F 12/1009* (2016.01)
  *G06F 9/38* (2018.01)

(52) U.S. Cl.
  CPC ...... *G06F 12/1027* (2013.01); *G06F 9/30043* (2013.01); *G06F 9/3842* (2013.01); *G06F 12/1009* (2013.01); *G06F 2212/68* (2013.01); *G06F 2212/684* (2013.01)

(58) Field of Classification Search
  CPC .. G06F 12/10; G06F 12/1009; G06F 12/1018; G06F 12/1027; G06F 12/1036; G06F 12/1045; G06F 12/1054; G06F 12/1063; G06F 2212/684; G06F 9/3842; G06F 9/3844; G06F 9/3846; G06F 9/3848; G06F 9/3004; G06F 9/30043; G06F 9/30047

See application file for complete search history.

(56) References Cited

U.S. PATENT DOCUMENTS

| 7,996,650 | B2 * | 8/2011 | Eddy | G06F 9/383 |
| | | | | 711/205 |
| 2022/0035679 | A1 * | 2/2022 | Sunwoo | G06N 20/00 |

FOREIGN PATENT DOCUMENTS

WO    WO-2013095392 A1 *    6/2013    .......... G06F 12/0862

OTHER PUBLICATIONS

Parallel Virtualized Memory Translation with Nested Elastic Cuckoo Page Tables by Stojkovic (post filing date) (Year: 2022).*
Recency-Based TLB Preloading by Saulsbury (Year: 2010).*
TLB Improvements for Chip Multiprocessors: Inter-Core Cooperative Prefetchers and Shared Last-Level TLBs by Lustig (Year: 2013).*

(Continued)

*Primary Examiner* — Paul M Knight
(74) *Attorney, Agent, or Firm* — McClure, Qualey & Rodack, LLP

(57) ABSTRACT

In one embodiment, a microprocessor, comprising: a translation lookaside buffer (TLB) configured to indicate that a virtual page address corresponding to a physical page address of a page of memory that a memory access instruction is attempting to access is missing in the TLB; a first micro-op corresponding to a first memory access instruction and configured to initiate a first speculative tablewalk based on a miss in the TLB of a first virtual page address; and a second micro-op corresponding to a second memory access instruction, the second micro-op configured to take over an active first speculative tablewalk of the first micro-op at its current stage of processing based on being older than the first micro-op and further based on having a virtual page address and properties that match the first virtual page address and properties for the first memory access instruction.

20 Claims, 3 Drawing Sheets

(56) References Cited

OTHER PUBLICATIONS

A Look at Several Memory Management Units, TLB-Refill Mechanisms, and Page Table Organizations by Jacob (Year: 1998).*
Translation Caching: Skip, Don't Walk (the Page Table) by Barr (Year: 2010).*
Software Prefetching and Caching for Translation Lookaside Buffers (Year: 1994).*

* cited by examiner

TABLEWALK TAKEOVER

TECHNICAL FIELD

The present invention relates in general to microprocessors, and in particular, microprocessors that perform page tablewalks in response to a translation lookaside buffer miss.

BACKGROUND

Many modern microprocessors support the concept of virtual memory. In a virtual memory system, instructions of a program executing on the microprocessor refer to data using virtual or linear addresses in a virtual address space of the microprocessor. The microprocessor translates virtual addresses into physical addresses that it uses to access physical memory.

A common virtual memory scheme supported by microprocessors is a paged memory system. A paged memory system employs a paging mechanism for translating, or mapping, virtual addresses to physical addresses. The physical address space is divided up into physical pages of fixed size. A common page size is 4 KB. The virtual addresses comprise a virtual page address portion and a page offset portion. The virtual page address specifies a virtual page (e.g., 4 KB) in the virtual address space. The paging mechanism of the microprocessor translates the virtual page address into a physical page address. This process is known as page translation. The page offset specifies a physical offset in the virtual and physical pages (e.g., a virtual or physical offset from the virtual or physical page address).

The operating system decides which physical pages in memory will be mapped to each virtual page and maintains page mapping information that specifies the mappings. When the microprocessor encounters an instruction that specifies a virtual address to access a location in memory, such as a load or store instruction, the microprocessor translates the virtual address to the proper physical address by using the operating system's page mapping information. The operating system maintains the page mapping information in system memory. Thus, the microprocessor reads the appropriate page mapping information from memory to translate the virtual address into the physical address. The page mapping information is typically hierarchically arranged in order to reduce its size, which requires the microprocessor to traverse the hierarchy by performing read operations at multiple levels of the hierarchy. For this reason, and because at least a portion of the page mapping information is commonly referred to as page tables, the process of the microprocessor traversing the page mapping information to translate a virtual address to a physical address is commonly referred to as a page table walk, or simply, table walk or as used primarily herein, a tablewalk. Further information about tablewalks may be found in U.S. Pat. No. 7,996,650 (hereinafter, the '650 patent), incorporated herein by reference in its entirety.

In the '650 patent, a translation lookaside buffer (TLB) is described as part of a mechanism to reduce the number of tablewalks to system memory by caching the page mapping information. When the microprocessor encounters a memory access instruction (e.g., a load or store instruction), the microprocessor provides the virtual address to the TLB and the TLB performs a lookup of the virtual page address. If the virtual page address hits in the TLB, then the TLB provides the corresponding translated physical page address and page characteristics, thereby avoiding the need to perform a tablewalk. However, if the virtual page address misses in the TLB, then the microprocessor has to perform a tablewalk.

With the above-context in mind, it is further noted that many microprocessors are superscalar. Superscalar microprocessors include such features as having multiple execution units with the capability of issuing multiple instructions to the execution units in a single clock cycle. Additional capabilities of superscalar microprocessors include performing out-of-order execution (e.g., the microprocessor may execute instructions out of the order specified by the program that includes the instructions) and performing speculative execution of instructions (e.g., the microprocessor executes instructions, or at least performs some of the actions prescribed by the instructions, before knowing with certainty whether the instructions will actually complete). Although the microprocessor may perform some of the actions prescribed by an instruction speculatively, the microprocessor is not allowed by the architecture to update the architectural state of the system with the results of an instruction until the instruction is no longer speculative, i.e., until it is certain that the instruction will complete (corresponding to the machine oldest state).

The '650 patent improved upon conventional practice for TLB misses that necessitated a tablewalk. For instance, for a conventional out-of-order execution microprocessor that suffers a TLB miss that necessitates a tablewalk, the microprocessor serializes the tablewalk with the other outstanding program instructions. That is, the conventional microprocessor waits until all program instructions older than the initiator instruction (the instruction that caused the TLB miss) have retired before it performs the tablewalk and does not issue to the execution units for execution any program instructions newer than the initiator instruction until it completes the tablewalk. In the '650 patent, a microprocessor is described that speculatively performs tablewalks, and only serializes the tablewalk when: 1) a system memory access associated with the tablewalk is required to be strongly ordered on the processor bus; 2) the processor needs to write to system memory to update the page mapping information in order to perform the tablewalk; or 3) the system memory page for which the tablewalk will update the TLB is a global page. However, tablewalking may still be improved.

SUMMARY

In one embodiment, a microprocessor, comprising: a translation lookaside buffer (TLB) configured to indicate that a virtual page address corresponding to a physical page address of a page of memory that a memory access instruction is attempting to access is missing in the TLB; a first micro-op corresponding to a first memory access instruction and configured to initiate a first speculative tablewalk based on a miss in the TLB of a first virtual page address; and a second micro-op corresponding to a second memory access instruction, the second micro-op configured to take over an active speculative tablewalk of the first micro-op at its current stage of processing based on being older than the first micro-op and further based on having a virtual page address and properties that match the first virtual page address and properties for the first memory access instruction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Figure 1:
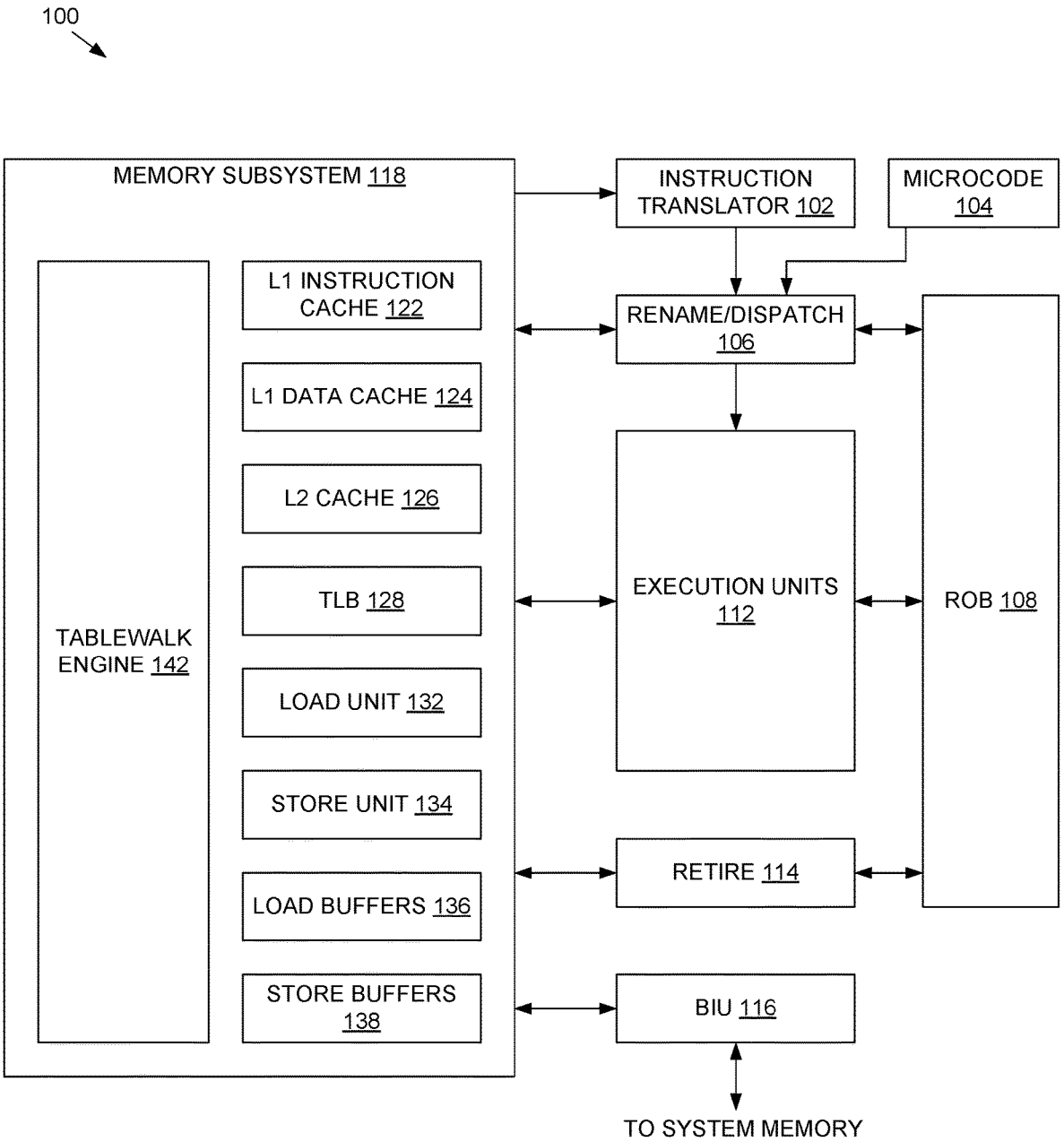
FIG. 1 is a block diagram showing an example microprocessor in which an embodiment of a tablewalk takeover system is implemented.

Certain embodiments of a tablewalk takeover system and method are disclosed that improve upon speculative tablewalk mechanisms of the past by remedying some processing inefficiencies that were involved in enforcing a machine oldest state for strongly ordered situations. In one embodiment, a tablewalk takeover system enables a tablewalk for an older memory access instruction (e.g., a store or load instruction) to assume or take over an active speculative tablewalk without restarting the tablewalk (e.g., assume or take over at the current stage of tablewalk processing that the younger memory access instruction had reached). This takeover occurs under certain conditions, namely, that each memory access instruction corresponding to the respective tablewalks are directed to the same virtual page address (e.g., same virtual page) and they match in their properties, as described further below. By doing so, processing results achieved from the speculative tablewalk for the younger memory access instruction are retained instead of discarded while updating the machine oldest state should a strongly ordered situation be encountered.

Digressing briefly, past tablewalking mechanisms were inefficient in that, should an older (but dispatched later into the pipeline) micro-op corresponding to a memory access instruction encounter a younger micro-op actively undergoing a tablewalk, the younger micro-op is evicted and the older micro-op initiates its own, new speculative tablewalk. In these cases, evicting the newer micro-op in favor of the older micro-op and starting a new tablewalk, particularly when the work for the evicted micro-op is almost complete or could have been completed, results in a loss of work already performed by the now-evicted micro-op, and is highly inefficient. In contrast, certain embodiments of a tablewalk takeover system evict the micro-op actively and speculatively tablewalking, yet take over the speculative tablewalking process at the current stage of processing instead of starting the tablewalk over, thus making use of the work already performed by the now-evicted micro-op during the tablewalking process.

Having summarized certain features of a tablewalk takeover system of the present disclosure, reference will now be made in detail to the description of a tablewalk takeover system as illustrated in the drawings. While a tablewalk takeover system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit hardware description language (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

Note that reference to tablewalks include terms that include the same or similar functionality, including page tablewalks, table walks, or the like, and include page tablewalks of virtual or linear space. Further, in some embodiments, a tablewalk comprises three steps. The first step is to read the necessary page mapping information from memory required to translate the virtual address to a physical address and to obtain the page characteristics. The second step is to update the page mapping information in system memory, if necessary. The third step is to allocate a translation lookaside buffer (TLB) entry and update it with the new page mapping information. Note that reference to takeover and take over are intended to convey the same process.

Referring now to FIG. 1, a block diagram illustrating a microprocessor 100 according to the present invention is shown. The microprocessor 100 includes an instruction translator 102, microcode 104, a rename/dispatch unit 106, a reorder buffer (ROB) 108, execution units 112, a retire unit 114, a bus interface unit (BIU) 116, and a memory subsystem 118. The memory subsystem 118 includes a level-1 (L1) instruction cache 122, an L1 data cache 124, a level-2 (L2) cache 126, a translation lookaside buffer (TLB) 128, a load unit 132, a store unit 134, load buffers 136, store buffers 138, and a tablewalk engine 142. In one embodiment, the load unit 132 and store unit 134 are included in the execution units 112. The BIU 116 interfaces the microprocessor 100 to a processor bus to which system memory and other devices, such as a system chipset, are coupled. For instance, the BIU 116 receives load or store requests that need to bypass both the cache hierarchy and write combine buffers (e.g., loads or stores that are either to uncacheable memory, MMIO devices, cacheable memory with a write-through trait, or atomic read-modify-write sequences that span two cache lines, so-called split lock transactions). When the BIU 116 receives one of these load or store requests, it determines a final destination (e.g., DRAM, V4 interface, PCIe, etc.) and splits the request into multiple transactions, if necessary. An operating system running on the microprocessor 100 stores page mapping information in the system memory, which the microprocessor 100 reads and writes to perform tablewalks, as described herein.

The instruction translator 102 receives macroinstructions from the memory subsystem 118, such as the L1 instruction cache 122, and translates the macroinstructions into microinstructions which it provides to the rename/dispatch unit 106. For certain macroinstructions, the instruction translator 102 transfers control to the microcode 104, which provides microinstructions to the rename/dispatch unit 106. Some of the microinstructions (micro-ops) are load or store instructions that access memory, referred to herein also as memory access instructions. That is, the load/store instructions specify virtual addresses to access memory or other devices in the memory space of the microprocessor 100 that the BIU 116 accesses on the processor bus using physical memory addresses. The TLB 128 caches virtual to physical page address translations and page characteristics of recently accessed memory pages to reduce the amount of time required by the microprocessor 100 to execute a load/store instruction.

The rename/dispatch unit 106 allocates entries in the ROB 108 for each microinstruction that is outstanding in the microprocessor 100. The microinstructions are allocated into the ROB 108 in program order and retired from the ROB 108 in program order by the retire unit 114, even though the execution units 112 may execute the microinstructions dispatched to them out of program order. In one embodiment, the age of a given micro-op may be determined from the relationship between indexes for the ROB 108 and retire unit 108. The store unit 134 executes store instructions by writing data to the store buffers 138, which subsequently write the data to memory, such as system memory, the L2 cache 126, and/or the L1 data cache 124. The load unit 132 executes load instructions by reading data into the load buffers 136 from the system memory, the L2 cache 126, and/or the L1 data cache 124.

When a load/store instruction misses in the TLB 128, the corresponding micro-op pushes the table walk operation in conjunction with the tablewalk engine 142, as described below with respect to FIG. 2.

Figure 2:
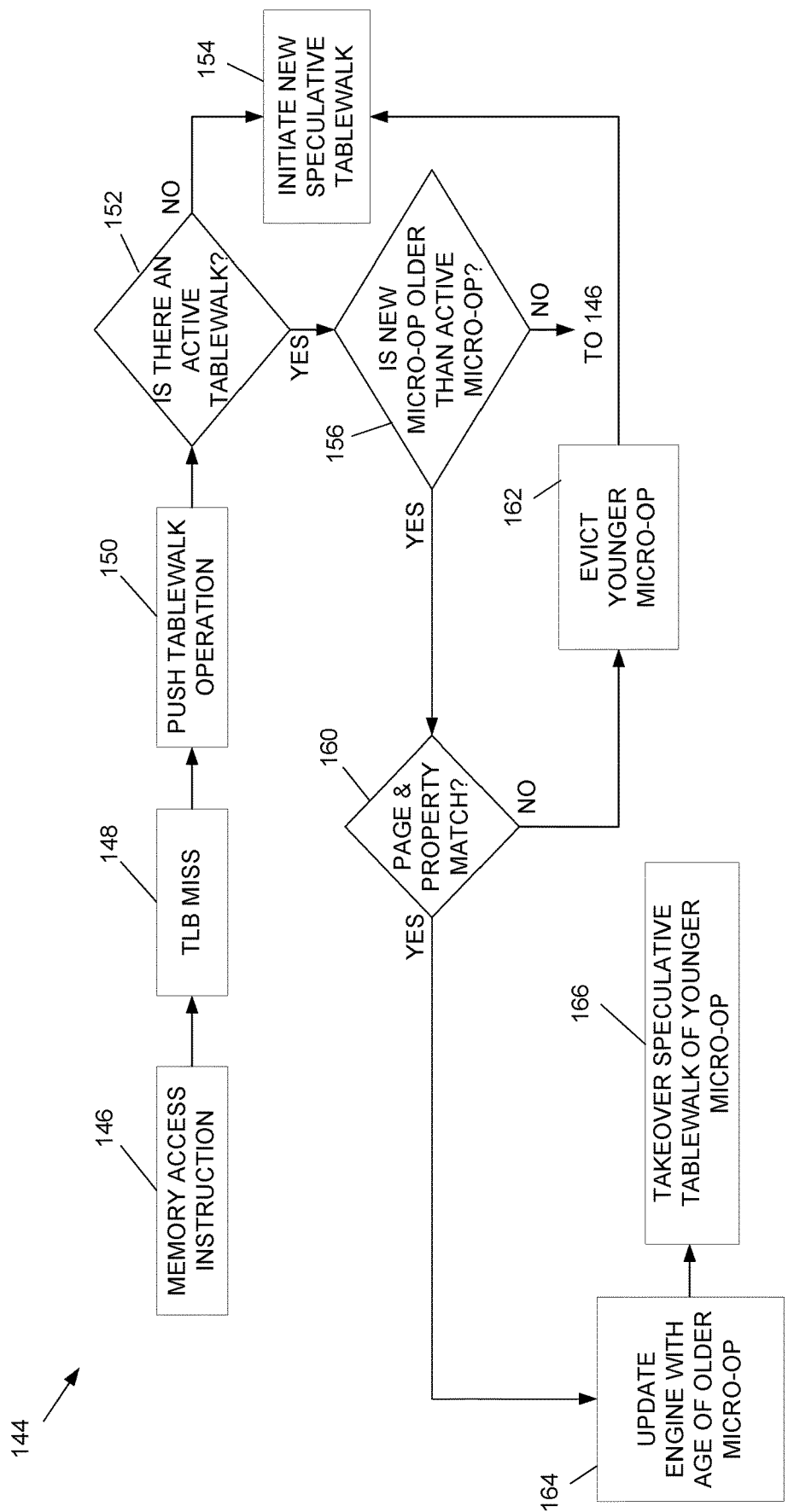
FIG. 2 is a flow diagram of an embodiment of an example tablewalk takeover method.

Attention is now directed to FIG. 2, which shows an embodiment of an example tablewalk takeover method 144. Before beginning the description of the method 144, it is noted that tablewalk takeovers of the disclosed embodiments may be performed regardless of whether there is an ordering situation that requires serialization (e.g., a serializing condition exists where the tablewalk is required to be the oldest before proceeding) or not. For instance, the tablewalk engine 142 (or in some embodiments, other logic of the microprocessor 100) determines whether a current tablewalk load operation is strongly-ordered. A tablewalk load operation is a load of page mapping information, such as a page directory entry or page table entry (also, paging entry), from memory into the microprocessor 100 that enables or triggers the tablewalk engine 142 to push a tablewalk operation. In one embodiment, a tablewalk load is strongly-ordered if the memory location contains a paging entry that is uncacheable (e.g., which by definition does not permit speculative access to it). In one embodiment, the tablewalk engine 142 determines whether the memory location for a paging entry has a characteristic of being uncacheable if its page-level cache disable (PCD) bit in the page mapping information is set. In particular, the microprocessor 100 performs the check to avoid requesting the BIU 116 to perform a transaction on the processor bus associated with a tablewalk that is in an incorrect order because the memory location for a paging entry is specified as uncacheable. Note that other and/or additional mechanisms may be used to determine if a memory location for a paging entry is uncacheable. For instance, memory type range registers (MTRRs) in conjunction with page attribute table (PAT) mechanisms that use PCD/PAT/PWT bits as a reference that combines with the MTRR trait to determine the real trait. In effect, the address of the memory location of a next level entry is combined with information from the current level (PCT, etc.) to determine whether the location of the next one is strongly-ordered. Additional information for MTTRs and PAT mechanisms are known in the art, and reference may be made to publicly available information such as software developer's manuals from Intel® (e.g., Addendum—Intel Architecture Software Developer's Manual, Vol. 3: system Programming Guide, herein incorporated by reference). Further, a given tablewalk load operation may also be strongly-ordered if the there is a need to update paging information (e.g., accessed or dirty bits in a paging entry) or if the resulting physical page is global. Further information about these situations may be found in the '650 patent described above.

As noted above, tablewalk takeovers may also be performed when there is not a serializing condition. For instance, there may be scenarios where there is an older store to the same location, or a memory fencing operation, which are not always a serialization case that requires the tablewalk engine to be oldest. Either the store/fence must eventually finish first, or the tablewalk engine is to be taken over by an instruction that is older than the store/fence.

In view of the foregoing explanation, the tablewalk takeover method 144 is presented in FIG. 2 and explained below without reference to a serialization case, with the understanding that a takeover may or may not involve a serialization case. Further, for the sake of illustration, the tablewalk takeover method 144 is described in the context of two example instructions, dispatched in reverse order, and possibly several clock cycles apart. These instructions, referred to below also as an older first micro-op and a younger or second micro-op are dispatched in reverse order (e.g., the younger micro-op is dispatched into the pipeline first). Note that the reference to first and second has not particular relevance, and in particular, do not necessarily equate to similar terms used in the claims.

At block 146, the microprocessor 100 receives a memory access instruction 146 (e.g., a load/store instruction), referred to hereinafter also as a second micro-op, as explained in the preceding paragraph. Flow proceeds to block 148.

At block 148, the microprocessor 100 detects that a virtual page address of the memory access instruction executing in the load unit 132 or store unit 134 missed in the TLB 128 of FIG. 1. Flow proceeds to block 150.

At block 150, the tablewalk engine 142 pushes a tablewalk operation. That is, the tablewalk engine 142 updates state within the microprocessor 100 to indicate that a tablewalk needs to be performed with respect to the memory page accessed by the memory access instruction. Flow proceeds to block 152.

At block 152, the second micro-op determines whether there is an active tablewalk. For purposes of this example, it is assumed that there is not an active tablewalk, and hence flow proceeds to block 154.

At block 154, the second micro-op initiates a new speculative tablewalk.

Assume now that an older memory access instruction, or the first micro-op, is dispatched into the pipeline. A similar flow proceeds for the first micro-instruction as explained similarly above in blocks 146, 148, and 150.

At block 152, the first micro-op determines whether there is an active tablewalk. If not, then flow proceeds to block 154. However, for this example, it is assumed that the second micro-op has not completed the (speculative) tablewalk operation, and hence there is a determination that there is an active tablewalk. Flow proceeds to block 156.

At block 156, the first micro-op determines whether it is older than the second micro-op that is performing the active tablewalk. If not, the flow proceeds to block 146 (e.g., after possibly an idle period), where the first micro-op replays into the pipeline (e.g., since there may or may not be a TLB miss that ensues at block 148). If the first micro-op is older than the second micro-op (as is the case in this illustrative example), then flow proceeds to block 160.

At block 160, the first micro-op compares its page and property to that of the page and property of the second, actively tablewalking micro-op. In other words, the first micro-op determines whether its page address (e.g., virtual page, such as same 4k region as one illustration) and properties are the same as those of the second micro-op. For instance, properties that may match include privilege level (e.g., whether both memory access instructions arise from the same programming code privilege level, where a match occurs if the programming code for both is user code or both supervisor code). Another example of properties to match include whether the type of operation represented by the memory access instructions are the same, where a match occurs if both are load operations, or both are store operations. Another example of a match in properties is where both instructions set an accessed or dirty bit, whereas for instance, if one of the instructions sets a dirty bit and the other does not, there is no match. Other types of properties to match involve the behavior associated with implementing the instructions. For instance, if one of the instructions is involved in a prefetch and the other is not, then these are different behaviors and so there is no match. As another example, if both instructions involves writeable operations, there is a match, whereas only one being writeable is no match. These and/or other properties may be the subject of the determination in block 160. Note that the property determination requires all properties to match (e.g., a match is both instructions involve a writeable or write-enabled operation, where the page is writeable and the micro-op seeks to write, and the setting of accessed or dirty bits). If there is no match in page address and properties, then flow proceeds to block 162, otherwise flow proceeds to block 164.

At block 162, the first micro-op causes the eviction of the second (younger) micro-op, and flow proceeds to block 154, where the first micro-op initiates a new speculative tablewalk.

At block 164, based on the match, the tablewalk engine 142 is updated so that the second micro-op tablewalk now represents the first micro-op. Flow proceeds to block 166.

At block 166, the first micro-op takes over the active, speculative tablewalk at the stage of processing where the second micro-op left off. In other words, unlike past techniques, the first micro-op does not initiate a new speculative tablewalk after evicting the younger micro-op. Rather, the first micro-op makes use of the work performed during the active tablewalk and continues from the current stage of processing.

Note that variations in the amount and/or ordering of steps may be implemented in the method 144, where some steps may be performed concurrently or in a different order than presented in FIG. 2. In some embodiments, fewer or additional numbers of steps may be performed.

Figure 3:
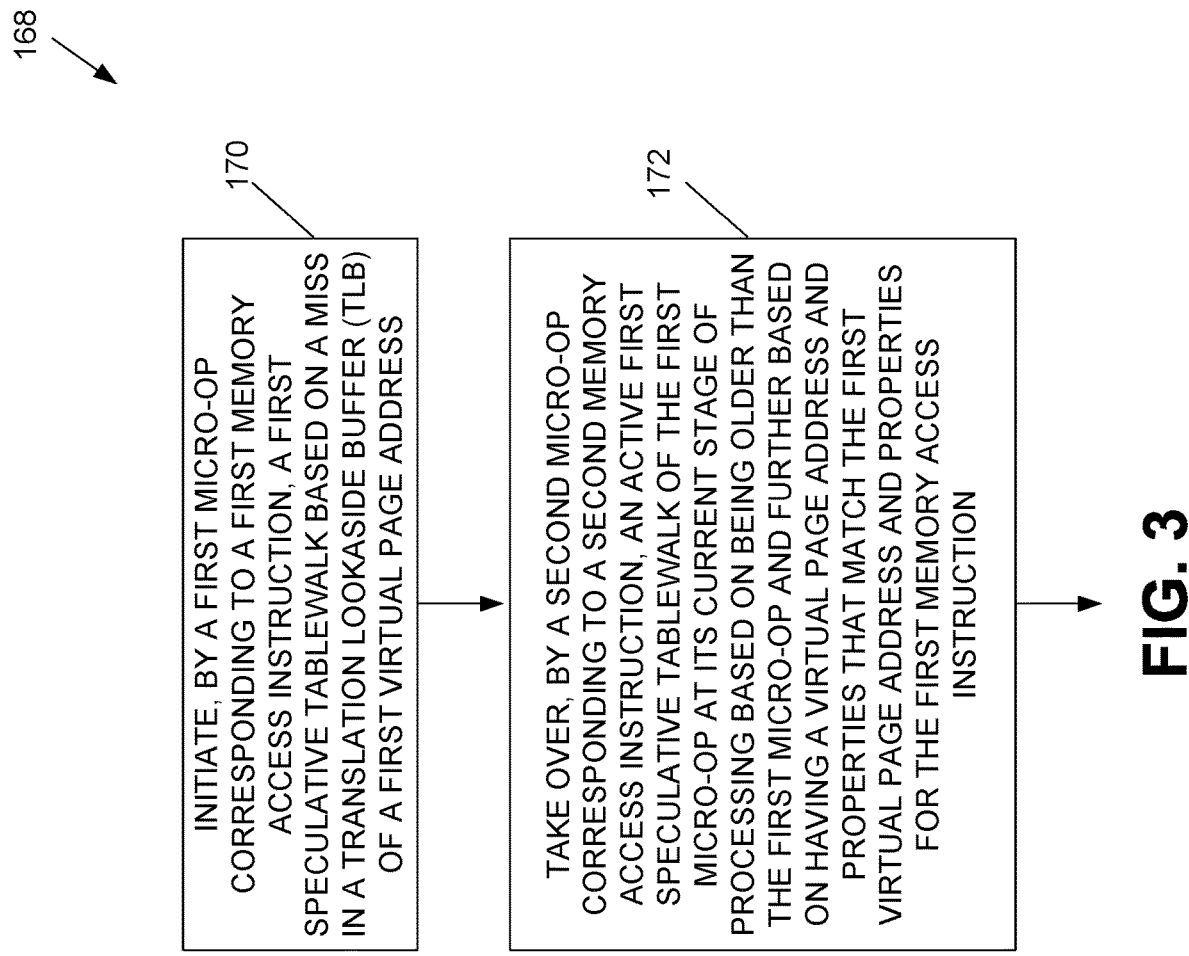
FIG. 3 is a flow diagram that shows an embodiment of another example tablewalk takeover method.

In view of the above description, it should be appreciated by one having ordinary skill in the art that one embodiment of another example tablewalk takeover method, denoted as method 168 in FIG. 3 and implemented in one embodiment by a microprocessor, comprises: initiating, by a first micro-op corresponding to a first memory access instruction, a first speculative tablewalk based on a miss in a translation lookaside buffer (TLB) of a first virtual page address (170); and taking over, by a second micro-op corresponding to a second memory access instruction, an active first speculative tablewalk of the first micro-op at its current stage of processing based on being older than the first micro-op and further based on having a virtual page address and properties that match the first virtual page address and properties for the first memory access instruction (172).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure. In some embodiments, functionality of the methods 144 and/or 168 may be implemented in a computer program product comprising a non-transitory, computer readable storage medium having computer readable code embodied therein for specifying a microprocessor configured to a perform speculative tablewalk.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A microprocessor, comprising:
   a translation lookaside buffer (TLB) configured to indicate that a virtual page address corresponding to a physical page address of a page of memory that a memory access instruction is attempting to access is missing in the TLB;
   a first micro-op corresponding to a first memory access instruction and configured to initiate a first speculative tablewalk based on a miss in the TLB of a first virtual page address; and
   a second micro-op corresponding to a second memory access instruction, the second micro-op configured to take over an active first speculative tablewalk of the first micro-op at its current stage of processing based on being older than the first micro-op and further based on having a virtual page address and properties that match the first virtual page address and properties for the first memory access instruction.

2. The microprocessor of claim 1, wherein the second micro-op pushes a tablewalk operation based on a TLB miss and after the first micro-op has initiated the first speculative tablewalk.

3. The microprocessor of claim 2, where the second micro-op is configured to determine if there is an active tablewalk, and responsive to there not being an active tablewalk, initiating a new speculative tablewalk.

4. The microprocessor of claim 3, wherein the second micro-op is configured to determine whether the second micro-op is older than the first micro-op based on determining there is the active first speculative tablewalk, and if not older, replaying into a pipeline.

5. The microprocessor of claim 4, wherein the second micro-op is configured to determine whether the virtual page address and properties corresponding to the second memory access instruction matches the first virtual page address and properties for the first memory access instruction based on the second micro-op being older than the first micro-op, and if not, the second micro-op is evicted and a new speculative tablewalk is initiated.

6. The microprocessor of claim 1, wherein the properties include privilege level.

7. The microprocessor of claim 6, wherein the privilege level includes user code and supervisory code.

8. The microprocessor of claim 1, wherein the properties include a type of memory access.

9. The microprocessor of claim 8, wherein the type of memory access includes load and store instructions.

10. The microprocessor of claim 1, wherein the properties include whether write-enabled or not.

11. The microprocessor of claim 1, wherein the properties include whether accessed or dirty bits are set or not.

12. The microprocessor of claim 1, wherein the match with the first virtual page address corresponds to a page of virtual memory space that maps to a page of memory.

13. The microprocessor of claim 1, further comprising a tablewalk engine, wherein the tablewalk engine for the first micro-op is updated with an age of the second micro-op based on the match.

14. A method implemented in a microprocessor, the method comprising:
   initiating, by a first micro-op corresponding to a first memory access instruction, a first speculative tablewalk based on a miss in a translation lookaside buffer (TLB) of a first virtual page address; and
   taking over, by a second micro-op corresponding to a second memory access instruction, an active first speculative tablewalk of the first micro-op at its current stage of processing based on being older than the first micro-op and further based on having a virtual page address and properties that match the first virtual page address and properties for the first memory access instruction.

15. The method of claim 14, further comprising pushing, by the second micro-op, a tablewalk operation based on a TLB miss and after the first micro-op has initiated the first speculative tablewalk.

16. The method of claim 15, further comprising determining, by the second micro-op, if there is an active tablewalk, and responsive to there not being an active tablewalk, initiating a new speculative tablewalk.

17. The method of claim 16, further comprising determining, by the second micro-op, whether the second micro-op is older than the first micro-op based on determining there is the active first speculative tablewalk, and if not older, replaying into a pipeline.

18. The method of claim 17, further comprising determining, by the second micro-op, whether the virtual page address and properties corresponding to the second memory access instruction matches the first virtual page address and properties for the first memory access instruction, and if not, evicting the second micro-op and initiating a new speculative tablewalk.

19. The method of claim 14, wherein the properties include one or more of privilege level, a type of memory access, whether write-enabled or not, whether accessed or dirty bits are set or not.

20. The method of claim 14, further comprising updating in a tablewalk engine for the first micro-op with an age of the second micro-op based on the match.

* * * * *